United States Patent [19]

Hohmann, Jr.

[11] 4,340,928
[45] Jul. 20, 1982

[54] ROTATABLE VEHICLE HEADLIGHTS

[76] Inventor: Thomas Hohmann, Jr., 1770 Ferguson Rd., 206 Fox Croft, Allison Park, Pa. 15101

[21] Appl. No.: 174,347

[22] Filed: Jul. 31, 1980

[51] Int. Cl.³ ............................................. B60Q 1/12
[52] U.S. Cl. ...................................... 362/49; 362/53; 362/82; 362/226; 362/233; 362/250; 362/286; 362/287; 362/372; 362/384; 362/386; 362/428
[58] Field of Search ...................... 362/49, 53, 82, 226, 362/233, 250, 286, 287, 372, 384, 386, 428

[56] References Cited

U.S. PATENT DOCUMENTS

| | | | |
|---|---|---|---|
| 1,080,110 | 12/1913 | Howard et al. | 362/36 |
| 1,100,946 | 6/1914 | Bjorlie | 362/36 |
| 1,308,204 | 7/1919 | Stout | 362/40 |
| 1,601,014 | 9/1926 | Wismer et al. | 362/49 |
| 1,675,239 | 7/1928 | Young | 362/36 |
| 1,678,495 | 7/1928 | Bergman | 362/38 |
| 2,536,828 | 1/1951 | Treese | 362/37 |
| 3,117,302 | 1/1964 | Cardarelli et al. | 362/35 |
| 4,225,902 | 9/1980 | Ishikawa | 362/43 |

*Primary Examiner*—Stephen J. Lechert, Jr.
*Attorney, Agent, or Firm*—Buell, Blenko, Ziesenheim & Beck

[57] ABSTRACT

Vehicle headlights that rotate in accordance with movement of the vehicle's steering system are disclosed. The rotatable lights are portable and suited for attachment on a variety of vehicles. The lights are rotated by means of small DC motors wired to a mechanical linkage mounted on the vehicle's steering column. The amount of rotation is determined by potentiometers mounted on the mechanical linkage and the DC motors. A logic circuit is also disclosed for use in conjunction with the device to enable each unit to be readily used on vehicles having different steering ratios.

7 Claims, 7 Drawing Figures

ROTATABLE VEHICLE HEADLIGHTS

This invention relates to vehicle headlights which rotate to align the light beam with the direction of the vehicle's wheels. When a vehicle is traveling a sharp curve or turning a corner, the light beam of a fixedly secured headlight does not illuminate the path over which the vehicle's wheels are traveling thereby restricting the driver's visibility. This invention overcomes that defect.

Rotatable vehicle headlights are not new. Numerous apparatus have been proposed for providing headlights which rotate to illuminate the path over which a vehicle will travel. However, these systems are all quite complex and each such unit is usually constructed for only one vehicle model. Many rotatable vehicle headlight systems of the prior art are designed to be built into the vehicle and are not readily removable.

This invention, however, is portable and can be easily installed as additional equipment on a wide variety of automobiles and other vehicles. Additionally, it can be easily transferred from one vehicle to another.

Another advantage of the invention is that it involves no complex mechanical linkage systems. Thus, there are no tedious adjustments which must be made to install or maintain the unit.

I propose a set of rotatable vehicle headlights comprising a plurality of headlamps each mounted in a reflector that is mechanically connected to a servo unit. I provide a mechanical linkage fitting over the vehicle's steering column which rotates with the steering column as the steering wheel is turned. A first potentiometer attached to the linkage senses the degree to which the vehicle's wheels have turned. This potentiometer is wired through a second potentiometer to the servo units which turn the headlights in accordance with the signal from the potentiometer. The second potentiometer is mechanically connected to the servo unit. After the headlight has turned the proper amount, the first and second potentiometer will balance and power, by means of a differential amplifier, will stop flowing to a DC motor in the servo stopping the movement of the headlight. When the steering column is again turned it will cause a change in the resistance in the first potentiometer which will permit current to flow to the servo unit of each headlamp. Thus activated, the servo unit will again turn the headlights.

I prefer to further provide a second DC motor and pair of additional potentiometers between the first and second potentiometer to better coordinate the rotation of the servo units with the degree of rotation of the linkage.

I also prefer to provide a mechanism which enables the unit to self-adjut when used in vehicles having different steering ratios.

I have devised four mechanical linkages to connect the unit to the vehicle's steering column. Each linkage is designed for particular applications. The linkage to be used on a particular vehicle will depend upon the type of steering column and engine compartment in the vehicle.

Other details, objects and advantages of the invention will become apparent as the following description of a certain present preferred embodiments thereof proceeds.

In the accompanying drawings, I have shown certain present preferred embodiments of the invention in which.

Figure 1:
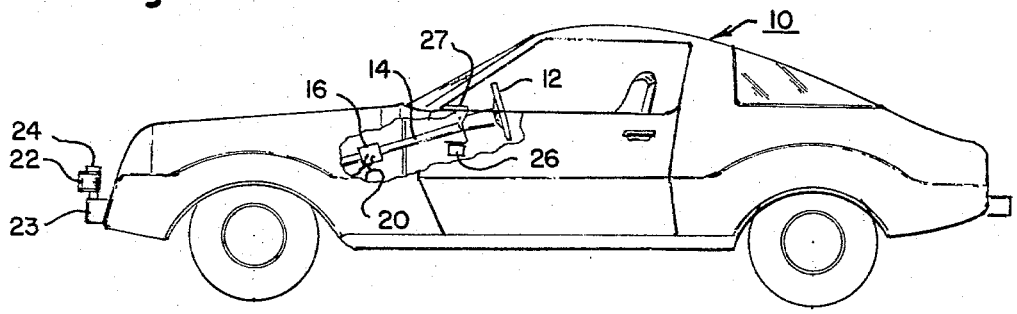
FIG. 1 is a side view of an automobile which is equipped with the device wherein portions of the automobile have been cut away to show the various components of the device.
Figure 2:
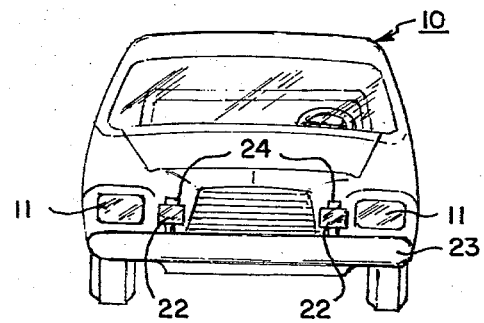
FIG. 2 is a front view of the automobile of FIG. 1.

Referring to the drawings, an automobile 10 equipped with the invention is shown in FIGS. 1 and 2. A pair of headlamps 22 each having an attached servo unit 24 are mounted on the car's bumper 23. The lights could also be mounted on the vehicles hood, roof or roll bar. Each headlamp is positioned so as not to obstruct the vehicle's own headlights 11. A potentiometer (see FIG. 6) is provided on each servo. The servos are electrically connected through these potentiometers by wires 20 to a second potentiometer 18 which is attached to a mechanical linkage 16. The linkage is attached to the car's steering column 14. When the driver turns the car's steering wheel 12 the steering column 14 also turns. Movement of the steering column will activate the mechanical linkage 16 which will change the resistance in potentiometer 18 (See FIG. 3). Such a change will cause current to flow to the servos which will turn the headlamps 22. Movement of the servos will also cause a change in the resistance in the potentiometers attached to them. At some point the resistance in the servos' potentiometers will balance the resistance in potentiometer 18 and current will stop flowing to the servos. A control switch 26 shown mounted on the car's dashboard 27 is provided for the unit to turn it on and off.

Figure 3:
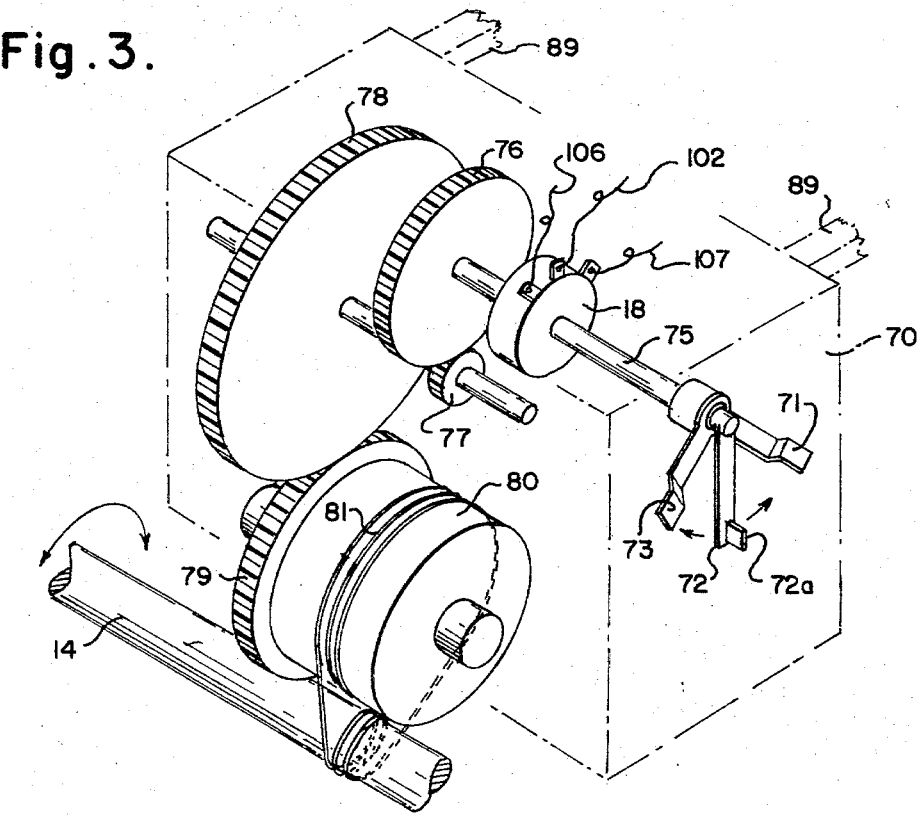
FIG. 3 is a side view of a first preferred embodiment of the mechanical linkage.
Figure 4:
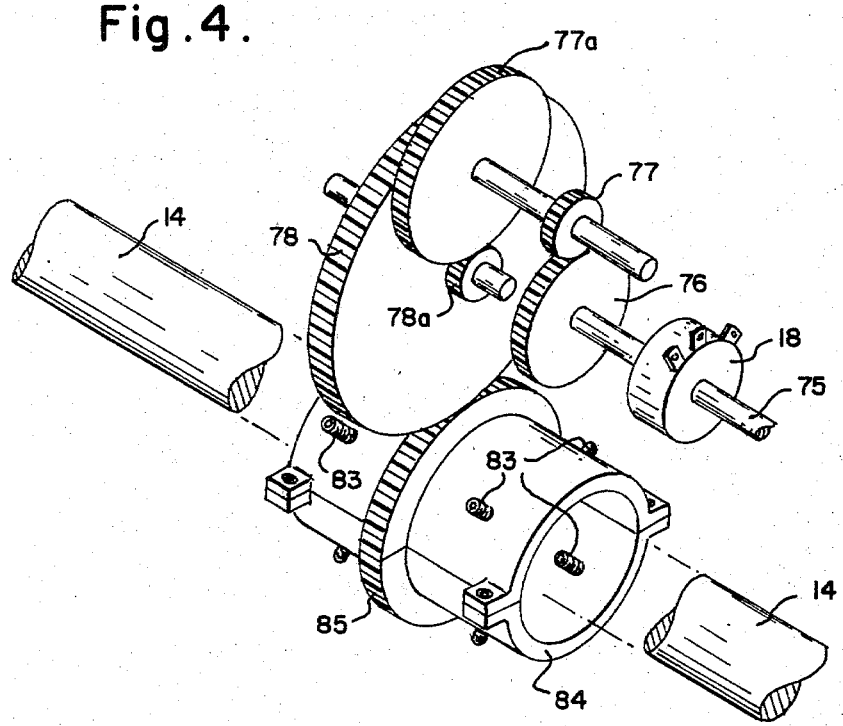
FIG. 4 is a perspective view of a second preferred embodiment of the mechanical linkage.
Figure 5:
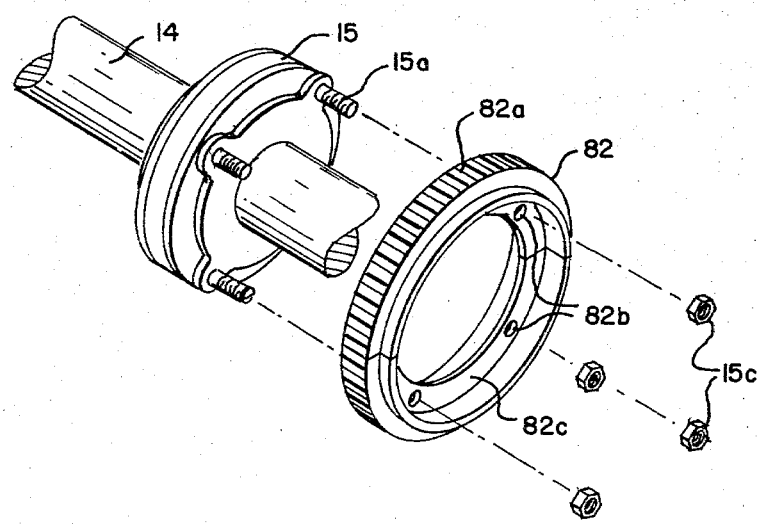
FIG. 5 is an exploded view of a third preferred embodiment of the mechanical linkage.

The system is attached to the vehicle's steering column through a mechanical linkage. As shown in FIGS. 3 to 5, the linkage may be adapted to fit various types of steering columns. A first preferred embodiment of linkage shown in FIG. 3 consists of a housing 70 on which coordination contacts 71, 72 and 73 (see FIG. 3) are mounted. A shaft 75 having contact 72 mounted at one end passes into the interior of the housing. The control potentiometer 18 is attached to the shaft in such a way that movement of the shaft will change the resistance of the potentiometer. A gear 76 is mounted at the interior end of shaft 75. This gear is coupled through a series of gears 77, 78 and 79 to a pulley 80. A cable, wire or cord 81 is wrapped around the pulley 80 and the steering column 14 in a manner so that movement of the shaft will be transmitted to the pulley 80 and associated gears. A pair of mounting bars 89 are provided to attach the housing to the engine compartment wall to permit the column to turn without moving the housing.

A second embodiment shown in FIG. 4 employs a split cylinder 84 in place of the pulley and cable. The split cylinder 84 is fitted over the steering column 14 and held in place by set screws 83. The gear system for this embodiment is similar to that of the embodiment of FIG. 3 except that additional gears 78a and 77a are provided to achieve the desired gear ratio. The gears would be mounted in a housing as shown in FIG. 3. Teeth 85 are provided on the split cylinder and positioned so as to engage the gear 78.

A third embodiment shown in FIG. 5 is designed for steering columns having a coupling device in the steering shaft. A split gear 82 having exterior teeth 82a is provided. The split gear 82 is fastened to the coupling 15 by bolts 15a in the coupling which pass through holes 82b in the inner rim 82c of the split gear. Nuts 15c are provided to secure the gear 82 to the coupling 15. The mechanical linkage housing 70 is fitted over the split gear 82 in a manner so that the teeth 82a provided on the exterior of the split gear will engage the gear 78 and thus move the other gears in the housing. This split gear could also be used in combination with the first embodiment if its teeth were replaced by grooves to receive the cord running to the pulley.

Figure 7:
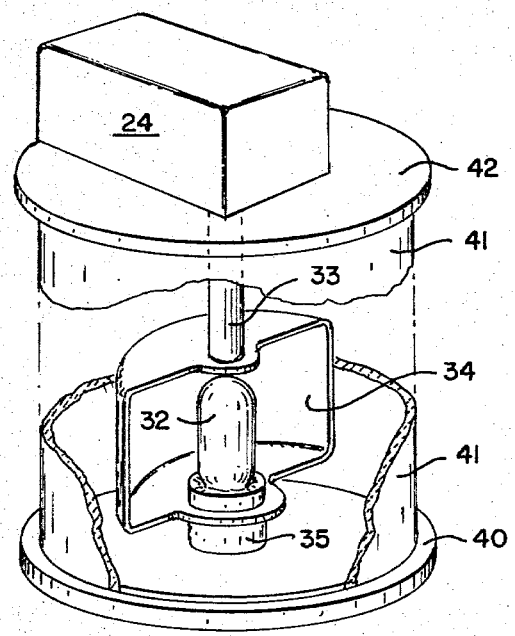
FIG. 7 is a perspective view of a preferred embodiment of the rotatable lamp used in this invention.

The headlight portion of the apparatus, shown in FIG. 7, is composed of a lightbulb 32 mounted on a post 35 and a reflector 34 which is pivotably fitted over the shaft 35 in a manner so as to permit the reflector 34 to rotate around the bulb 32. A second shaft 33 connects the reflector to the servo unit 24. The bulb could also be permanently mounted in the reflector. A transparent globe 41 is fitted on the base 40 and a lid 42 is provided atop the glove 41. A servo unit 24 is mounted on the top lid 42 so that the servo is operably connected by shaft 33 to the reflector 34. Thus, when the servo is activated it will turn the reflector 34.

Figure 6:
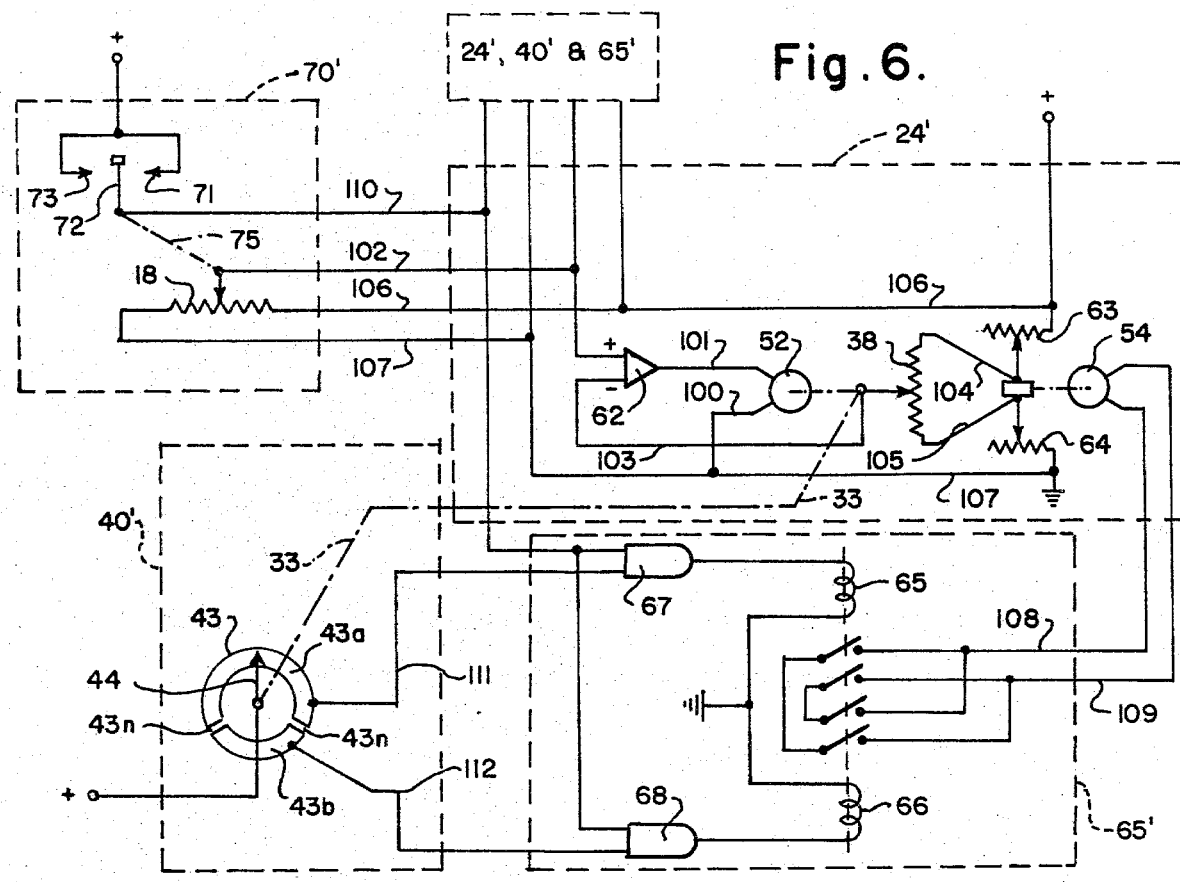
FIG. 6 is an electrical diagram for the apparatus.

The electrical system of the apparatus diagramed in FIG. 6 consists of four parts (i) the coordination hookup consisting of electrical contacts in the mechanical linkage shown in box 70', (ii) the servo circuit shown in box 24', (iii) the light base contacts shown in box 40', and (iv) the logic circuit shown in box 65'. Each headlamp and servo combination contains a servo circuit 24', logic circuit 65' and base contacts 40' which are connected in parallel to the mechanical linkage electrical contacts 70'. While I have shown only one of each type of circuit the second servo circuit, logic circuit and base contacts would be identical to and interconnected in the same manner as the first circuits here shown. The second circuits would be connected to the mechanical linkage contacts through a parallel connection to lines 102, 106, 107 and 110.

The servo unit 24 (FIG. 7) contains the servo circuit 24' and logic circuit 65'. Two DC motors 52 and 54 are provided. One DC motor 52 turns the reflector 34 through shaft 33 (See FIG. 7). Movement of this shaft also changes the resistance in potentiometer 38 attached to the shaft. The second DC motor 54 is a control motor which is mechanically connected to two potentiometers 63 and 64.

As shown in FIG. 6, DC motor 52 is electrically connected by wires 100, 101, 102 and 107 to the potentiometer 18 on the mechanical linkage through a differential amplifier 62. The amplifier interprets the resistance change in potentiometer 18 and provides a signal to DC motor 52 to it will turn the reflector the proper amount. A second potentiometer 38 is connected to the shaft 33 in a manner so that movement of the shaft will change the resistance in the potentiometer. The potentiometer is wired to the differential amplifier 62 by wire 103 and to potentiometers 63 and 64 by wires 104 and 105. These potentiometers 63 and 64 are also connected to potentiometer 18 on the mechanical linkage by wires 106 and 107. DC motor 54 is controlled by a logic circuit 65' comprised of two relays 65 and 66 and two AND gates 67 and 68. The relays and AND gates are interconnected as shown and connected to DC motor 54 by wires 108 and 109. The AND gates are connected to the coordination circuit 70' through wires 110, and to light base contacts 40' through wires 111 and 112. The coordination circuit, light base contacts and logic circuit enable the apparatus to self adjust to the steering ratio of the vehicle to which it is attached. Such ratios vary among different types of vehicles.

The basic circuitry for the device begins at the coordination circuit 70'. A potentiometer 18 is mechanically connected to the steering column so that movement of the steering column will cause a resistance change in the potentiometer (see FIG. 3). This potentiometer is connected by wire 102 to a differential amplifier 62 in each headlamp unit. Potentiometer 18 is also wired to two control potentiometers 63 and 64 by wires 106 and 107. These potentiometers 63 and 64 are in turn connected through wires 104 and 105 to the headlamp potentiometer 38. The headlamp potentiometer 38 is also connected to a differential amplifier 62 by wire 103. A first DC motor 52 is electrically connected to the amplifier by wire 101 and to potentiometer 64 by wire 100. This motor is mechanically connected to headlamp potentiometer 38 so that operation of the motor will change the potentiometer's resistance. Movement of the steering column will cause a change in resistance in potentiometer 18. That change will permit current to flow through the amplifier 62 to the DC motor 52. The current activates the DC motor which turns the reflector 34 about the light 32 contained therein. Movement of the reflector also causes a change in resistance in potentiometer 38. At some point the resistance in potentiometer 18 will equal that in potentiometer 38 and current flow will cease by means of differential amplifier thereby stopping the DC motor 52 which turns the reflector. The attached reflector light will remain in that position until the resistance in potentiometer 18 is changed by movement of the steering column.

To assure that the headlamps rotate the proper amount regardless of the vehicle on which it is used I have provided light base contacts 40', a coordination circuit 70' and logic circuits 65'. Each light base contact circuit is comprised of a contact plate 43 having two contact areas 43a and 43b and two normal positions 43n is attached to the base 40 and a slide contact 44 attached to the reflector 34. The slide contact 44 is attached in a manner permitting it to move with the reflector 34 as the reflector is turned by the servo unit. Alternatively, the contact plate 43 could be placed in the servo unit 24 and the slide contact 44 attached to the shaft 33 between the servo motor and the reflector (See FIG. 7). The contact plate 43 and slide contact 44 are wired to the servo units 24 through a logic circuit 65' by wires 111 and 112. They are provided to tell the logic circuit if the ratio between the turn of the steering wheel and the turn of the reflector is too large or too small.

The coordination circuit and associated mechanical components shown in FIG. 3 and utilized in all preferred embodiments of the invention is comprised of a housing 70 having three contacts 71, 72 and 73 pivotably attached to it at a common point. Contact 72 is connected through a gear system to the vehicle's steering column in a manner so that it will move when the steering column is turned. However, the gear system must be such that maximum rotation of the steering column will cause contact 72 to rotate less than 360°. Contacts 71 and 73 are positioned on opposite sides of contact 72. A flange 72a is provided on contact 72 which will engage contacts 71 and 73 when contact 72 abuts them. As contact 72 moves back and forth it will engage contacts 71 and 73 and move them apart. Contacts 71 and 73 will remain spread apart at their maximum displacment after contact 72 has moved back and forth its maximum displacement. This maximum displacement established the turns ratio of the vehicle. Contacts 71 and 73 are wired to a voltage source and contact 72 is connected to the AND gates 67 and 68 of the logic circuit 65' by wire 110. Whenever contact 72 is at the extreme right or extreme left it will electrically touch either contact 71 or 73 causing current to flow to the AND gates. Whenever contact 72 is at the extreme right or left position the potentiometer 18 in the mechanical linkage will also be at its extreme right or left position and the reflector and attached slide contact will also be at an extreme left or right position. If the slide contact lies in the normal region 43n no additional currents will flow to the AND gates. However if the slide contact lies on contact 43a the ratio is too large and current flows from the slide contact 44 to AND gate 67. This will turn gate 67 on which will turn relay 65 on, which will turn DC motor 54 on. Relay 65 sets the polarity of DC motor 54 in such a way that it rotates in the direction as to increase the resistance of potentiometers 63 and 64. This increase will continue until the reflector moves into a normal region. The reflector will move towards a normal because the increase in the resistance of potentiometers 63 and 64 will cause an electrical inbalance in the differential amplifier circuit causing DC motor 52 to rotate the reflector towards a region of normal operation.

If the slide contact 44 was on contact 43b (when contact 72 was at maximum displacement) then the ratio would be too small and current would flow from the slide contact to contact 43b and to AND gate 68. This would turn AND gate 68 on which will turn relay 66 on which will turn DC motor 54 on in such a way that the polarity on motor 54 makes the motor turn in a direction that would decrease the resistance in potentiometers 63 and 64. This decrease will continue until the reflector moves into a normal region. The reflector will move towards a normal region because the decrease in resistance of potentiometers 63 and 64 will cause an electrical inbalance in the differential amplifier circuit causing DC motor 52 to rotate the reflector towards a regional of normal operation no additional current will flow to the AND gate, therefore the ratio is fine.

In the above manner the apparatus will self adjust for use in vehicles having different steering ratios.

While I have shown and described certain preferred embodiments of the invention it is to be distinctly understood that the invention is not limited thereto but may be otherwise variously embodied within the scope of the following claims.

I claim:

1. A rotatable vehicle headlight system comprising:
   (a) a mechanical linkage adapted to fit a vehicle's steering column in a manner so that movement of the steering column will activate the mechanical linkage;
   (b) a first potentiometer attached to the mechanical linkage in a manner so that its resistance will change when the linkage is activated;
   (c) at least one DC motor electrically connected to the first potentiometer;
   (d) a second potentiometer electrically connected to the first potentiometer and mechanically connected to one of the D.C. motors;
   (e) at least one reflector pivotably connected to each DC motor;
   (f) at least one light bulb mounted within each reflector;
   (g) a power source electrically connected to the light bulbs and DC motors; and
   (h) a switch electrically connected to the power source.

2. The headlight system of claim 1 also comprising a differential amplifier electrically connected to the DC motors and the first and second potentiometer.

3. The headlight system of claim 1 wherein the mechanical linkage is comprised of:
   (a) a housing;
   (b) a plurality of gears mounted in the housing;
   (c) a shaft connected to the gears and mechanically connected to the first potentiometer;
   (d) a pulley attached to the gears; and
   (e) a cord running from the pulley to the steering shaft.

4. The system of claim 3 also comprising a split gear attached to the steering shaft and adapted to receive the cord.

5. The headlight system of claim 1 wherein the mechanical linkage is comprised of:
   (a) a housing;
   (b) a plurality of gears mounted in the housing and mechanically connected to the first potentiometer; and
   (c) a sleeve sized to fit over the steering column and having a drive gear about its exterior which engages the plurality of gears.

6. The headlight system of claim 1 wherein the mechanical linkage is comprised of:
   (a) a housing;
   (b) a plurality of gears mounted in the housing, and mechanically connected to the first potentiometer; and
   (c) a split gear engaging the plurality of gears and sized and adapted for attachment to a coupling in the vehicle's steering column.

7. The headlight system of claim 1 also comprising:
   (a) a headlight base for each reflector on which the reflector and at least one lightbulb are mounted;
   (b) a transparent globe fitted on each base and encircling the lightbulb and reflector thereon;
   (c) a lid attached to the top of each globe;
   (d) a contact plate having at least two contact regions and two normal regions;
   (e) a contact attached to each reflector and positioned to make electrical contact with the contact and normal regions of the contact plate whenever the reflector is rotated;
   (f) a logic circuit comprising:
      (i) a pair of AND gates connected in series to the contact areas of the contact plate,
      (ii) a pair of relay switches connected to the AND gates and the power source.
   (g) a second DC motor electrically connected to the relay switches;
   (h) a pair of potentiometers mechanically connected to the second DC motor and electrically connected to the second potentiometer; and
   (i) three contacts pivotally mounted on the mechanical linkage wherein two contacts are wired to the power source and the third contact is wired to the AND gates and mounted so that movement of the steering shaft will cause the third contact to move toward one of the other two contacts.

* * * * *

UNITED STATES PATENT AND TRADEMARK OFFICE
CERTIFICATE OF CORRECTION

PATENT NO. : 4,340,928
DATED : July 20, 1982
INVENTOR(S) : THOMAS HOHMANN, JR.

It is certified that error appears in the above-identified patent and that said Letters Patent are hereby corrected as shown below:

Column 1, line 57, "self-adjut" should be --self-adjust--.

Column 3, line 59, "motor 52 to" should read --motor 52 so--.

Column 5, line 6, "displacment" should be --displacement--.

Signed and Sealed this

Twenty-first Day of September 1982

[SEAL]

Attest:

GERALD J. MOSSINGHOFF

Attesting Officer

Commissioner of Patents and Trademarks